(12) United States Patent
Li

(10) Patent No.: US 11,782,850 B2
(45) Date of Patent: Oct. 10, 2023

(54) INFORMATION PROCESSING METHOD, SERVER, TERMINAL, AND COMPUTER STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Gefei Li, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 237 days.

(21) Appl. No.: 17/415,954

(22) PCT Filed: Jul. 24, 2019

(86) PCT No.: PCT/CN2019/097578
§ 371 (c)(1),
(2) Date: Jun. 18, 2021

(87) PCT Pub. No.: WO2020/125014
PCT Pub. Date: Jun. 25, 2020

(65) Prior Publication Data
US 2022/0075583 A1    Mar. 10, 2022

(30) Foreign Application Priority Data
Dec. 18, 2018 (CN) .......................... 201811552592.2

(51) Int. Cl.
G06F 3/038 (2013.01)
G06F 13/16 (2006.01)
(Continued)

(52) U.S. Cl.
CPC ............ G06F 13/1621 (2013.01); G06F 3/14 (2013.01); G06T 7/11 (2017.01)

(58) Field of Classification Search
CPC ........ G06F 13/1621; G06F 3/14; G06F 18/00; G06F 3/1454; G06F 16/957; G06F 18/24;
(Continued)

(56) References Cited

U.S. PATENT DOCUMENTS 9,507,806 B1 * 11/2016 Kolam .................... H04N 7/012
9,679,075 B1 * 6/2017 Kolam .................... H04L 67/02
(Continued)

FOREIGN PATENT DOCUMENTS

| CN | 103514241 A | 1/2014 |
| CN | 104391890 A | 3/2015 |

OTHER PUBLICATIONS

International Search Report in the international application No. PCT/CN2019/097578, dated Oct. 24, 2019, 2 pgs.
(Continued)

*Primary Examiner* — Thuy N Pardo
(74) *Attorney, Agent, or Firm* — Cooper Legal Group, LLC

(57) ABSTRACT

Embodiments of the present invention disclose an information processing method. The method comprises: receiving an acquisition request sent by a terminal for acquiring an image to be displayed, wherein the acquisition request carries an identifier of the image, and the image comprises a first object to be displayed and a second object to be displayed; acquiring, on the basis of the acquisition request, the image corresponding to the identifier, and performing identification on the image to obtain a first image region and a second image region, wherein the first image region comprises the first object, and the second image region comprises the second object; and determining a sending
(Continued)

order, and sequentially sending, according to the sending order, the first image region and the second image region to the terminal. Also disclosed by the embodiments of the present invention are a server, a terminal, and a computer storage medium.

16 Claims, 3 Drawing Sheets

(51) Int. Cl.
*G06T 7/11* (2017.01)
*G06F 3/14* (2006.01)

(58) Field of Classification Search
CPC ........ G06T 7/11; G09G 5/14; G09G 2310/04; G09G 2320/0252; G09G 2350/00; G09G 2370/02
USPC .......................................... 345/204, 667, 682
See application file for complete search history.

(56) References Cited

U.S. PATENT DOCUMENTS

| | | | |
|---|---|---|---|
| 2008/0071877 A1* | 3/2008 | Beach | G06F 16/51 707/E17.031 |
| 2016/0350943 A1* | 12/2016 | Shin | A63F 13/50 |
| 2018/0128734 A1* | 5/2018 | Ikuyama | C12Q 1/02 |
| 2019/0139256 A1* | 5/2019 | Kim | G06V 10/7788 |
| 2022/0020139 A1* | 1/2022 | Weiss | G06F 3/04842 |

OTHER PUBLICATIONS

English translation of the Written Opinion of the International Search Authority in the international application No. PCT/CN2019/097578, dated Oct. 24, 2019, 3 pgs.

* cited by examiner

INFORMATION PROCESSING METHOD, SERVER, TERMINAL, AND COMPUTER STORAGE MEDIUM

CROSS-REFERENCE TO RELATED APPLICATION

The embodiments of the disclosure are filed based upon and claim priority to Chinese Patent Application No. 201811552592.2, filed on Dec. 18, 2018, the disclosure of which is hereby incorporated by reference in its entirety.

TECHNICAL FIELD

The disclosure relates to the technical field of electronics and information, and more particularly, to an information processing method, server, terminal and computer storage medium.

BACKGROUND

In the related art, when a user needs to view a to-be-displayed image, a terminal mainly loads and displays the image through the following modes for viewing of the user. In a first mode, a to-be-displayed image is displayed after the whole image is loaded completely; and during the image loading process, the user cannot see any image information. In a second mode, a to-be-displayed image is loaded and displayed row by row, such that the image may be sequentially displayed from top to bottom.

However, in the first loading and displaying method, the terminal cannot display any image information to the user when loading the image; and in the second loading and displaying method, the terminal cannot display an image including a to-be-displayed object to the user first. That is, the terminal cannot display one image including the to-be-displayed object to the user first in the related art.

SUMMARY

In order to solve the above-mentioned technical problem, the embodiments of the disclosure are intended to provide an information processing method, server, terminal and computer storage medium, to solve the problem that the terminal cannot first display one image including the to-be-displayed object to the user in the related art.

The technical solutions of the disclosure are implemented as follows.

An information processing method may include the following operations.

An acquisition request for acquiring a to-be-displayed image is received from a terminal, wherein the acquisition request carries an identifier of the to-be-displayed image; and the to-be-displayed image includes a first to-be-displayed object and a second to-be-displayed object.

The to-be-displayed image corresponding to the identifier is acquired based on the acquisition request, and the to-be-displayed image is identified to obtain a first image region and a second image region, wherein the first image region includes the first to-be-displayed object; and the second image region includes the second to-be-displayed object.

A sending order is determined, and the first image region and the second image region are sequentially sent to the terminal in the sending order.

Optionally, the operation that the to-be-displayed image corresponding to the identifier is acquired based on the acquisition request, and the to-be-displayed image is identified to obtain the first image region and the second image region may include the following operations.

The to-be-displayed image corresponding to the identifier is acquired based on the acquisition request.

The to-be-displayed image is identified with a saliency detection method to obtain the first image region and a first saliency priority corresponding to the first image region, and the second image region and a second saliency priority corresponding to the second image region, wherein the first saliency priority is higher than the second saliency priority.

Correspondingly, the operation that the sending order is determined, and the first image region and the second image region are sequentially sent to the terminal in the sending order may include the following operations.

The sending order is determined based on the first saliency priority and the second saliency priority.

The first image region and the second image region are sequentially sent to the terminal based on the sending order.

Optionally, the operation that the first image region and the second image region are sequentially sent to the terminal based on the sending order may include the following operations.

At least two first sub-image regions are determined in the first image region.

A first sending priority of each first sub-image region is determined.

Each first sub-image region is sent to the terminal according to the first sending priority, and the second image region is sent to the terminal after the at least two first sub-image regions are sent completely.

Optionally, the operation that each first sub-image region is sent to the terminal according to the first sending priority, and the second image region is sent to the terminal after the at least two first sub-image regions are sent completely may include the following operations.

At least two second sub-image regions are determined in the second image region.

A second sending priority of each second sub-image region is determined.

Each first sub-image region is sent to the terminal according to the first sending priority.

Each second sub-image region is sent to the terminal according to the second sending priority after the at least two first sub-image regions are sent completely.

Optionally, the operation that the first sending priority of each first sub-image region is determined may include the following operations.

Analysis is performed on scenario of each first sub-image region to obtain a first analysis result.

The first sending priority of each first sub-image region is determined based on the first analysis result.

Correspondingly, the operation that the second sending priority of each second sub-image region is determined may include the following operations.

Analysis is performed on scenario of each second sub-image region to obtain a second analysis result.

The second sending priority of each second sub-image region is determined based on the second analysis result.

Optionally, the operation that the first image region and the second image region are sequentially sent to the terminal based on the sending order may include the following operations.

First gray values of pixel in the first image region and second gray values of pixel in the second image region are respectively acquired.

Feature parameters of the pixel in the first image region are sent to the terminal according to an order of the first gray values from large to small.

After the feature parameters of the pixel in the first image region are sent completely, feature parameters of the pixel in the second image region are sent to the terminal according to an order of the second gray values from large to small.

Optionally, the operation that the first image region and the second image region are sequentially sent to the terminal based on the sending order may include the following operations.

First position parameters of pixel in the first image region and second position parameters of pixel in the second image region are respectively acquired.

Feature parameters of the pixel in the first image region are sent to the terminal row by row based on the first position parameters.

After the feature parameters of the pixel in the first image region are sent completely, feature parameters of the pixel in the second image region are sent to the terminal row by row based on the second position parameters.

Optionally, the operation that the first image region and the second image region are sequentially sent to the terminal based on the sending order may include the following operations.

Feature parameters of a first part of pixel in the first image region are sent to the terminal.

After the feature parameters of the first part of pixel in the first image region are sent completely, feature parameters of a first part of pixel in the second image region are sent to the terminal.

After the feature parameters of the first part of pixel in the second image region are sent completely, feature parameters of a second part of pixel in the first image region are sent to the terminal.

After the feature parameters of the second part of pixel in the first image region are sent completely, feature parameters of a second part of pixel in the second image region are sent to the terminal.

The first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

Optionally, the operation that the first image region and the second image region are sequentially sent to the terminal based on the sending order may include the following operations.

Feature parameters of a first part of pixel in the first image region are sent to the terminal.

After the feature parameters of the first part of pixel in the first image region are sent completely, feature parameters of a second part of pixel in the first image region are sent to the terminal.

After the feature parameters of the second part of pixel in the first image region are sent completely, feature parameters of a first part of pixel in the second image region are sent to the terminal.

After the feature parameters of the first part of pixel in the second image region are sent completely, feature parameters of a second part of pixel in the second image region are sent to the terminal.

The first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

An information processing method may include the following operations.

An acquisition request for acquiring a to-be-displayed image is sent to a server, wherein the acquisition request carries an identifier of the to-be-displayed image.

A first image region and a second image region that are sequentially sent from the server in a sending order are sequentially received, and displayed, wherein the first image region and the second image region are obtained by the server through identifying the to-be-displayed image corresponding to the identifier of the to-be-displayed image; and the sending order is determined by the server.

A server may include:

a first processor, a first memory and a first communication bus.

The first communication bus is configured to implement communication connection between the first processor and the first memory.

The first processor is configured to execute a program of an information processing method in the first memory, to implement the following steps.

An acquisition request for acquiring a to-be-displayed image is received from a terminal, wherein the acquisition request carries an identifier of the to-be-displayed image; and the to-be-displayed image includes a first to-be-displayed object and a second to-be-displayed object.

The to-be-displayed image corresponding to the identifier is acquired based on the acquisition request, and the to-be-displayed image is identified to obtain a first image region and a second image region, wherein the first image region includes the first to-be-displayed object; and the second image region includes the second to-be-displayed object.

A sending order is determined, and the first image region and the second image region are sequentially sent to the terminal in the sending order.

A terminal may include:

a second processor, a second memory and a second communication bus.

The second communication bus is configured to implement communication connection between the second processor and the second memory.

The second processor is configured to execute a program of an information processing method in the second memory, to implement the following steps.

An acquisition request for acquiring a to-be-displayed image is sent to a server, wherein the acquisition request carries an identifier of the to-be-displayed image.

A first image region and a second image region that are sequentially sent from the server in a sending order are sequentially received, and displayed, wherein the first image region and the second image region are obtained by the server through identifying the to-be-displayed image corresponding to the identifier of the to-be-displayed image; and the sending order is determined by the server.

There is provided a computer storage medium having stored thereon one or more programs that when executed by one or more processors, implement steps of the information processing method.

According to the information processing method, server, terminal and computer storage medium provided by the embodiments of the disclosure, the server receives a acquisition request from the terminal for acquiring a to-be-displayed image including a first to-be-displayed object and a second to-be-displayed object; acquires the to-be-displayed image corresponding to an identifier based on the acquisition request, and identifies the to-be-displayed image to obtain a first image region and a second image region, wherein the first image region includes a first to-be-displayed object; and the second image region includes a second to-be-displayed object; and sequentially sends the first image region and the second image region to the terminal in a sending order. In this way, the server may sequentially send the first image region and the second image region to the terminal in the sending order, and the terminal can receive the first image region and the second image region based on the sending order of a processor, such that the terminal may display one image including the to-be-displayed object to the user first, thereby solving the problem that the terminal cannot display an image including the to-be-displayed object to the user first in the related art; and in addition, as the operation of identifying the to-be-displayed image is performed on the server, the energy consumption and the amount of computation of the terminal can be reduced.

DETAILED DESCRIPTION

A clear and complete description of the technical solutions in the embodiments of the disclosure will be given below, in conjunction with the accompanying drawings in the embodiments of the disclosure.

It is be understood that reference throughout this specification to "the embodiment of the disclosure" or "the above embodiment" means that particular features, structures, or characteristics described in connection with the embodiment are included in at least one embodiment of the disclosure. Thus, the appearances of the phrases "in the embodiment of the disclosure" or "in the above embodiment" in various places throughout this specification are not necessarily all referring to the same embodiment. Furthermore, the particular features, structures, or characteristics may be combined in any suitable manner in one or more embodiments. The sequence numbers of the foregoing processes do not mean execution sequences in various embodiments of the disclosure. The execution sequences of the processes should be determined according to functions and internal logics of the processes, and should not be construed as any limitation to the implementation processes of the embodiments of the disclosure. The serial numbers of the embodiments of the disclosure are merely for description and do not represent a preference of the embodiments.

Figure 1:
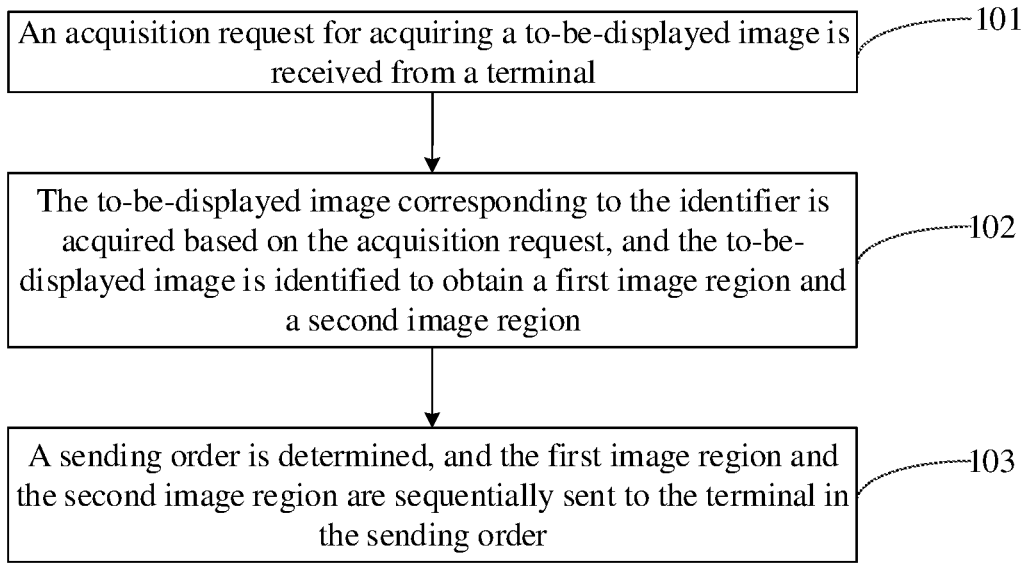
FIG. 1 is a schematic flowchart of an information processing method provided in an embodiment of the disclosure.

The embodiments of the disclosure provide an information processing method, which may be applied to a server. As illustrated in FIG. 1, the method may include the following steps.

In Step 101, an acquisition request for acquiring a to-be-displayed image is received from a terminal.

The acquisition request carries an identifier of the to-be-displayed image; and the to-be-displayed image includes a first to-be-displayed object and a second to-be-displayed object. In other embodiments, the acquisition request may further include information such as the terminal identifier, terminal Internet Protocol (IP) address and target address. It is be understood that the first to-be-displayed object or the second to-be-displayed object may merely include one object, and may also include at least two objects. The object may be any object such as the portrait, animal or plant.

In the embodiment of the disclosure, the terminal may be a mobile phone, a tablet, a notebook, a palm computer, a Personal Data Assistant (PDA), a portable media player, a navigation apparatus, a wearable device, a smart bracelet, a pedometer, a digital Television (TV) or a desk computer or the like.

When the terminal needs to display the to-be-displayed image, the terminal may send the acquisition request for acquiring the to-be-displayed image to the server. In an embodiment, the acquisition request may be a request generated by a user performing operation on the to-be-displayed image. For example, when the user browses a webpage, the terminal does not load the image but only displays a region corresponding to the to-be-displayed image on the terminal, and the terminal may generate the acquisition request through the operation of the user on the region. In another embodiment, the acquisition request may be a request generated by the terminal by enabling the user to input the target address on the terminal. The target address may be a target IP address or a target domain name. For example, when the user inputs the target address on the terminal, the terminal sends the acquisition request to the server based on the target address. The identifier of the to-be-displayed image may correspond to the target address.

In the embodiment of the disclosure, the acquisition request may carry an identifier of one to-be-displayed image, and may also carry identifiers of at least two to-be-displayed images.

In Step 102, the to-be-displayed image corresponding to the identifier is acquired based on the acquisition request, and the to-be-displayed image is identified to obtain a first image region and a second image region.

The first image region includes the first to-be-displayed object; and the second image region includes the second to-be-displayed object.

Before Step 102, the server may further execute the operation of extracting the identifier of the to-be-displayed image from the acquisition request.

If the identifier acquired by the server indicates that a to-be-displayed image needs to be acquired, the server acquires a to-be-displayed image corresponding to the identifier based on the acquisition request, and identifies the piece of to-be-displayed image to obtain the first image region and the second image region. If the identifier acquired by the server indicates that at least two pieces of to-be-displayed images need to be acquired, the server acquires at least two pieces of to-be-displayed images corresponding to the identifier based on the acquisition request, and identifies each piece of to-be-displayed image in the at least two pieces of to-be-displayed images to obtain the first image region and the second image region in each piece of to-be-displayed image The embodiment of the disclosure takes the case where the identifier acquired by the server indicates that a to-be-displayed image needs to be acquired as an example for description. It is be understood that when the identifier indicates that at least two pieces of to-be-displayed images need to be acquired, the case is similar to the case where the identifier indicates that a to-be-displayed image needs to be acquired, and will not be repeated thereto by the disclosure.

The server acquires the to-be-displayed image corresponding to the identifier based on the acquisition request, which may include that: the server acquires, based on the acquisition request from a local storage device or an external device, feature parameters of pixel in the to-be-displayed image corresponding to the identifier. Correspondingly, the to-be-displayed image is identified to obtain the first image region and the second image region, which may include that: the to-be-displayed image is identified to obtain the first image region and the second image region based on the feature parameters of the pixel in the to-be-displayed image. The feature parameter may include a position parameter and a pixel parameter. The pixel parameter may include at least one of a gray parameter, a depth parameter or a color parameter.

In an embodiment, the to-be-displayed image is identified to obtain the first image region and the second image region, which may include that: the to-be-displayed image is identified with a saliency detection method to obtain the first image region and the second image region. The saliency priority of the first image region is higher than that of the second image region. In another embodiment, the to-be-displayed image is identified to obtain the first image region and the second image region, which may include that: the to-be-displayed image is identified with a face identification method to obtain the first image region and the second image region. The first image region characterizes a face region in the to-be-displayed image, and the second image region is a region other than the face in the to-be-displayed image. In still another embodiment, the to-be-displayed image is identified to obtain the first image region and the second image region, which may include that: a foreground part of the to-be-displayed image is identified to obtain the first image region and the second image region. The first image region characterizes a foreground region in the to-be-displayed image, and the second image region is a region other than the foreground region in the to-be-displayed image.

In other embodiments, by identifying the to-be-displayed image, at least three image regions may further be obtained, which is not limited thereto by the disclosure.

In Step 103, a sending order is determined, and the first image region and the second image region are sequentially sent to the terminal in the sending order.

The sending order may be determined based on an identification method when the to-be-displayed image is identified. For example, when the to-be-displayed image is identified with the saliency detection method, the sending order may be determined based on the saliency priority; when the to-be-displayed image is identified with the face identification method, the sending order may be that the region characterized by the face is sent first or sent subsequently; and when the foreground part of the to-be-displayed image is identified, the sending sequence may be that the foreground part is sent first or sent subsequently.

In the embodiment, the first image region and the second image region are sequentially sent to the terminal in the sending order, which includes that: the first image region and the second image region are sequentially sent to the terminal. In other embodiments, the first image region and the second image region are sequentially sent to the terminal in the sending order, which includes that: the second image region and the first image region are sequentially sent to the terminal. It is to be understood that sequentially sending the first image region and the second image region to the terminal may be that after the first image region is sent completely, the second image region is sent to the terminal, and may also be that a part of region in the first image region is sent first to the terminal, a part of region in the second image region is then sent to the terminal, the other part of region in the first image region is then sent to the terminal, and the other part of region in the second image region is at last sent to the terminal.

In the embodiment of the disclosure, the server may sequentially send the first image region and the second image region to the terminal in the sending order, and the terminal can receive the first image region and the second image region based on the sending order of the processor, such that the terminal may display one image including the to-be-displayed object to the user first, thereby solving the problem that the terminal cannot display one image including the to-be-displayed object to the user first in the related art; and in addition, as the operation of identifying the to-be-displayed image is performed on the server, the energy consumption and the amount of computation of the terminal can be reduced.

Figure 2:
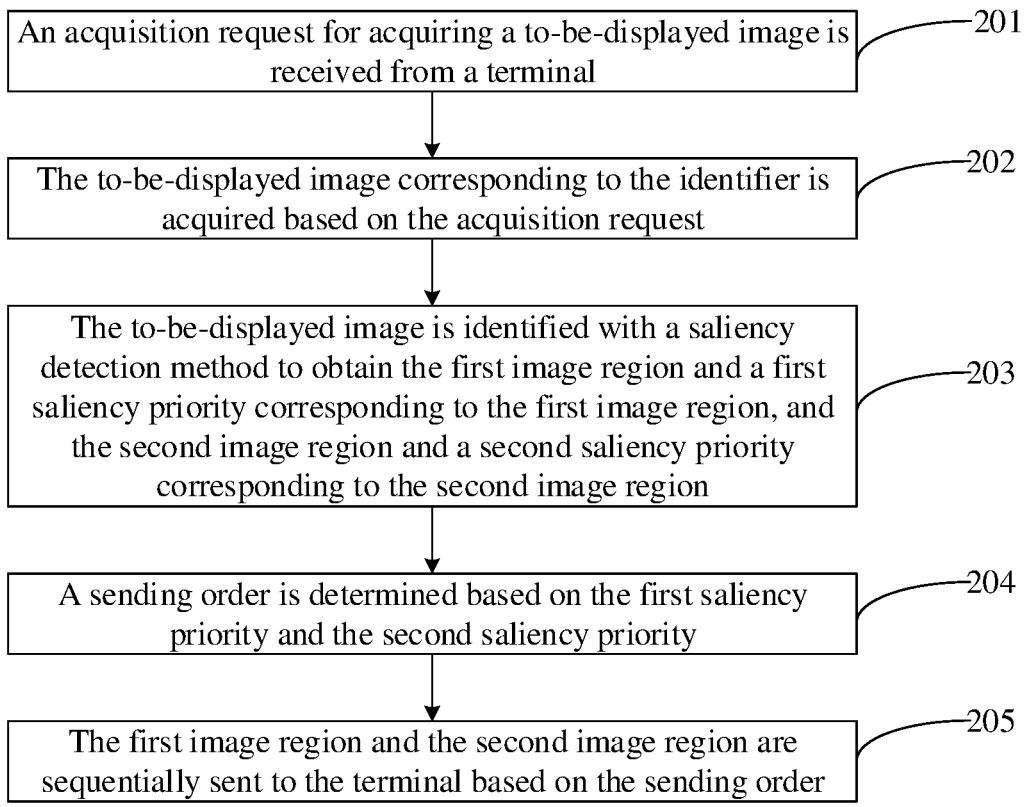
FIG. 2 is a schematic flowchart of another information processing method provided in an embodiment of the disclosure.

Based on the above embodiment, the embodiments of the disclosure provide an information processing method, which may be applied to a server. As illustrated in FIG. 2, the method may include the following steps.

In Step 201, an acquisition request for acquiring a to-be-displayed image is received from a terminal.

The acquisition request carries an identifier of the to-be-displayed image; and the to-be-displayed image includes a first to-be-displayed object and a second to-be-displayed object.

In Step 202, the to-be-displayed image corresponding to the identifier is acquired based on the acquisition request.

In Step 203, the to-be-displayed image is identified with a saliency detection method to obtain the first image region and a first saliency priority corresponding to the first image region, and the second image region and a second saliency priority corresponding to the second image region.

The first saliency priority is higher than the second saliency priority.

The saliency detection method in the embodiment of the disclosure may be a plane visual saliency detection method, and may also be a stereoscopic visual saliency detection method.

A specific implementation of Step 203 may be as follows: the server identifies a to-be-displayed image A with the saliency detection method to obtain two image regions B and C, and a saliency priority corresponding to the image region B and a saliency priority corresponding to the image region C, compares the saliency priority corresponding to the image region B with the saliency priority corresponding to the image region C, and takes a higher saliency priority in the two saliency priorities as a first saliency priority, an image region corresponding to the higher saliency priority as the first image region, a lower saliency priority in the two saliency priorities as a second saliency priority, and an image region corresponding to the lower saliency priority as the second image region.

In Step 204, a sending order is determined based on the first saliency priority and the second saliency priority.

In a case where the first saliency priority is higher than the second saliency priority, the sending order is determined based on the first saliency priority and the second saliency priority, which may include that: the sending order of sequentially sending the first image region and the second image region to the terminal is determined based on the first saliency priority and the second saliency priority.

In Step 205, the first image region and the second image region are sequentially sent to the terminal based on the sending order.

The first image region and the second image region are sequentially sent to the terminal based on the sending order, which may include that: attribute information of the to-be-displayed image, the first image region and the second image region are sequentially sent to the terminal based on the sending order. The attribute information of the to-be-displayed image is configured to characterize overall parameters of the to-be-displayed image. The attribute information of the to-be-displayed image may include: at least one of a data size of the to-be-displayed image, a memory space occupied by the to-be-displayed image, a size of the to-be-displayed image, a resolution of the to-be-displayed image, a bit depth of the to-be-displayed image or the number of pixel of the to-be-displayed image.

In the embodiment of the disclosure, the first image region and the second image region are sequentially sent to the terminal based on the sending order, which may include that: a first sending policy of the first image region and a second sending policy of the second image region are determined; and based on the sending order, the first image region is sent with the first sending policy, and the second image region is sent with the second sending policy, to the terminal.

The first sending policy may be acquired based on feature parameters of pixel in the first image region; and the second sending policy may be acquired based on feature parameters of pixel in the second image region.

In an embodiment, a specific implementation that based on the sending order, the first image region is sent with the first sending policy, and the second image region is sent with the second sending policy, to the terminal may refer to the descriptions on steps A1-A3.

In Step A1, first gray values of pixel in the first image region and second gray values of pixel in the second image region are respectively acquired.

The first gray values of the pixel in the first image region and the second gray values of the pixel in the second image region are respectively acquired, which may include that: the first gray values and first position parameters of the pixel in the first image region, and the second gray values and second position parameters of the pixel in the second image region are respectively acquired.

In Step A2, feature parameters of the pixel in the first image region are sent to the terminal according to an order of the first gray values from large to small.

The feature parameter in the step should at least include the position parameter and the gray parameter. In other embodiments, the feature parameter may further include the depth parameter and/or the color parameter, etc.

In an implementation, the server may sort the acquired first gray values according to an order from large to small, and send the feature parameters of the pixel in the first image region to the terminal according to the order of the first gray values from large to small. For example, the server may first send a feature parameter of a pixel point having the first gray value of 255 in the first image region, then send a feature parameter of a pixel point having the first gray value of 254 in the first image region, . . . , till send a feature parameter of a pixel point having the first gray value of 0 in the first image region. In this way, when receiving the first image region, the terminal may first receive a feature parameter of a pixel point having a highest gray value, such that the user first acquires information of the pixel point having the highest gray value in the first image region.

In another implementation, the server may divide the acquired first gray values into at least two gray level ranges at different gray levels, and send feature parameters of pixel in the gray level ranges to the terminal according to an order of the gray levels from high to low. For example, the server may respectively divide the first gray values into a first gray level range (200, 255], a second gray level range (150, 200], a third gray level range (100, 150], a fourth gray level range (50, 100] and a fifth gray level range (0, 50], and sequentially send feature parameters of pixel in the first gray level range, feature parameters of pixel in the second gray level range, feature parameters of pixel in the third gray level range, feature parameters of pixel in the fourth gray level range and feature parameters of pixel in the fifth gray level range to the terminal.

In Step A3, after the feature parameters of the pixel in the first image region are sent completely, feature parameters of the pixel in the second image region are sent to the terminal according to an order of the second gray values from large to small.

A specific implementation that the feature parameters of the pixel in the second image region are sent to the terminal according to the order of the second gray values from large to small may be similar to Step A2. The specific implementation may refer to the descriptions on Step A2 and will not be repeated herein.

In another embodiment, a specific implementation that based on the sending order, the first image region is sent with the first sending policy, and the second image region is sent with the second sending policy, to the terminal may refer to the descriptions on steps B1-B3.

In Step B1, first position parameters of pixel in the first image region and second position parameters of pixel in the second image region are respectively acquired.

The first position parameters of the pixel in the first image region and the second position parameters of the pixel in the second image region are respectively acquired, which may include that: the first position parameters and pixel parameters of the pixel in the first image region, and the second position parameters and pixel parameters of the pixel in the second image region are respectively acquired. The pixel parameter may include at least one of a gray parameter, a depth parameter or a color parameter.

In Step B2, feature parameters of the pixel in the first image region are sent to the terminal row by row based on the first position parameters.

In Step B3, after the feature parameters of the pixel in the first image region are sent completely, feature parameters of the pixel in the second image region are sent to the terminal row by row based on the second position parameters.

In still another embodiment, a specific implementation that based on the sending order, the first image region is sent with the first sending policy, and the second image region is sent with the second sending policy, to the terminal may include that: the first image region is sent at a low resolution, the second image region is sent at the low resolution, the first image region is sent at an original resolution, and the second image region is sent at the original resolution, to the terminal sequentially. The specific sending method may refer to the descriptions on step C1-C4.

In Step C1, feature parameters of a first part of pixel in the first image region are sent to the terminal.

The first part of pixel in the first image region are configured to form the first image region with the low resolution. For example, the server may send feature parameters of a preset proportion of pixel in the first image region to the terminal. The preset proportion may be independently selected according to a requirement of the user, for example, the preset proportion is ½, ¼, ⅑, etc.

In Step C2, after the feature parameters of the first part of pixel in the first image region are sent completely, feature parameters of a first part of pixel in the second image region are sent to the terminal.

The first part of pixel in the second image region are configured to form the second image region with the low resolution.

The density of the first part of pixel in the second image region and the density of the first part of pixel in the first image region may be the same, and may also be different, i.e., resolutions of images in the first image region with the low resolution that is formed by the first part of pixel in the second image region, and the first image region with the low resolution that is formed by the first part of pixel in the second image region may be the same, and may also be different.

In Step C3, after the feature parameters of the first part of pixel in the second image region are sent completely, feature parameters of a second part of pixel in the first image region are sent to the terminal.

The second part of pixel in the first image region are pixel other than the first part of pixel in the first image region.

In Step C4, after the feature parameters of the second part of pixel in the first image region are sent completely, feature parameters of a second part of pixel in the second image region are sent to the terminal.

The second part of pixel in the second image region are pixel other than the first part of pixel in the second image region.

In still another embodiment, a specific implementation that based on the sending order, the first image region is sent with the first sending policy, and the second image region is sent with the second sending policy, to the terminal may include that: the first image region is sent at a low resolution, the first image region is sent at an original resolution, the second image region is sent at the low resolution, and the second image region is sent at the original resolution, to the terminal sequentially. The specific sending method may refer to the descriptions on step D1-D4.

In Step D1, feature parameters of a first part of pixel in the first image region are sent to the terminal.

In Step D2, after the feature parameters of the first part of pixel in the first image region are sent completely, feature parameters of a second part of pixel in the first image region are sent to the terminal.

In Step D3, after the feature parameters of the second part of pixel in the first image region are sent completely, feature parameters of a first part of pixel in the second image region are sent to the terminal.

In Step D4, after the feature parameters of the first part of pixel in the second image region are sent completely, feature parameters of a second part of pixel in the second image region are sent to the terminal.

It is to be noted that the descriptions on the same steps and same contents in the embodiment with the other embodiments may refer to the descriptions in the other embodiments, and will not be repeated herein.

In the embodiment of the disclosure, the server may sequentially send the first image region and the second image region to the terminal in the sending order, and the terminal can receive the first image region and the second image region based on the sending order of the processor, such that the terminal may display one image including the to-be-displayed object to the user first, thereby solving the problem that the terminal cannot display one image including the to-be-displayed object to the user first in the related art; and in addition, as the operation of identifying the to-be-displayed image is performed on the server, the energy consumption and the amount of computation of the terminal can be reduced.

Figure 3:
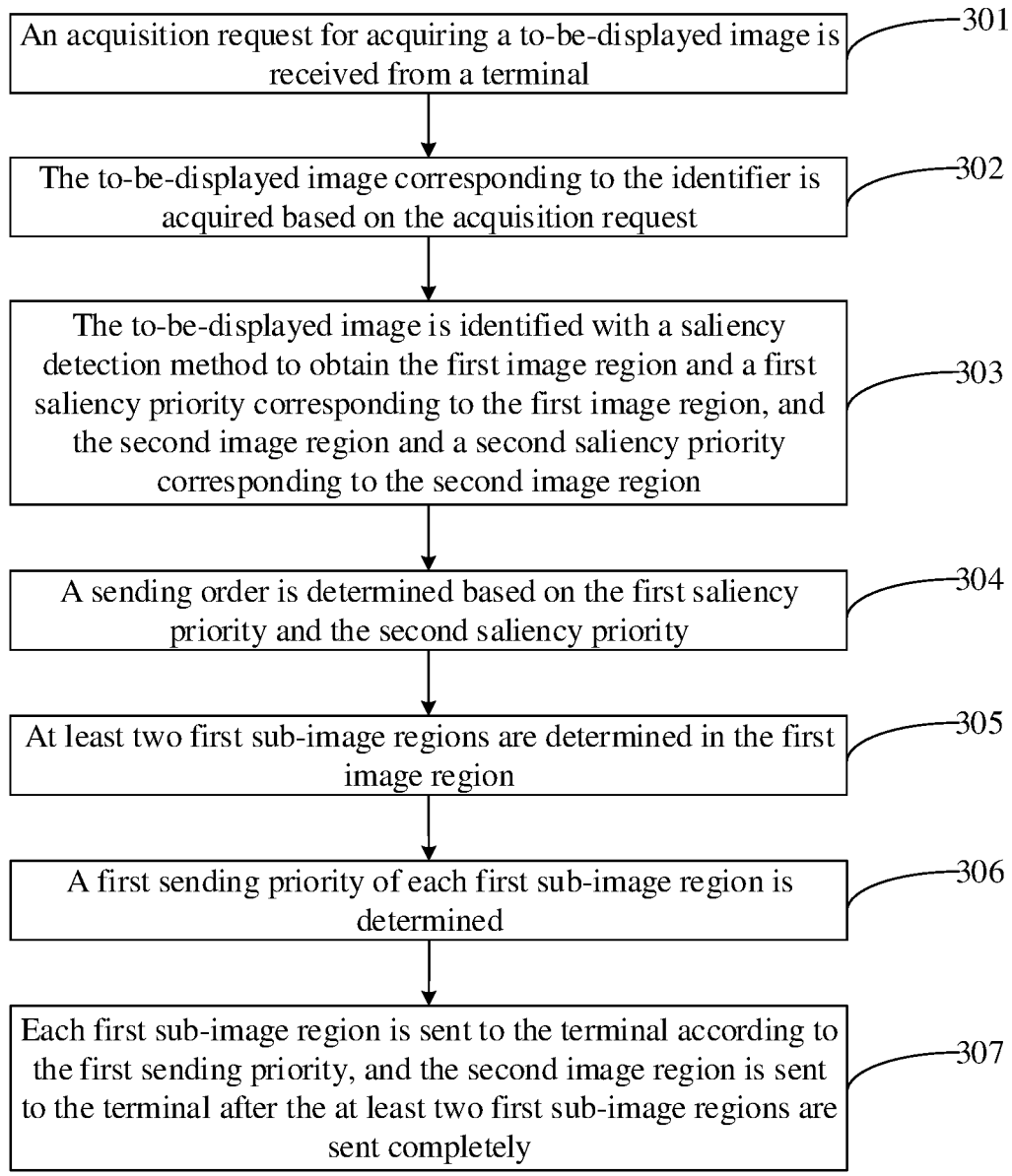
FIG. 3 is a schematic flowchart of still another information processing method provided in an embodiment of the disclosure.

Based on the above embodiment, the embodiments of the disclosure provide an information processing method, which may be applied to a server. As illustrated in FIG. 3, the method may include the following steps.

In Step 301, An acquisition request for acquiring a to-be-displayed image is received from a terminal.

The acquisition request carries an identifier of the to-be-displayed image. The to-be-displayed image includes a first to-be-displayed object and a second to-be-displayed object.

In Step 302, the to-be-displayed image corresponding to the identifier is acquired based on the acquisition request.

In Step 303, the to-be-displayed image is identified with a saliency detection method to obtain the first image region and a first saliency priority corresponding to the first image region, and the second image region and a second saliency priority corresponding to the second image region.

The first saliency priority is higher than the second saliency priority. The first image region includes the first to-be-displayed object; and the second image region includes the second to-be-displayed object.

In an embodiment, the to-be-displayed image is identified with the saliency detection method, which may include that: attribute information of the to-be-displayed image is acquired, and if the attribute information of the to-be-displayed image meets a preset condition, the to-be-displayed image is identified with the saliency detection method. The attribute information of the to-be-displayed image meets the preset condition, which may correspond to the attribute information of the to-be-displayed image. For example, the attribute information of the to-be-displayed image meets the preset condition, which may include: at least one of that the data size of the to-be-displayed image is less than the preset data size, the memory space occupied by the to-be-displayed image is less than the preset memory space, the resolution of the to-be-displayed image is less than the preset resolution, the bit depth of the to-be-displayed image is less than the preset bit depth, or the number of pixel of the to-be-displayed image is less than the preset number.

In another embodiment, the to-be-displayed image is identified with the saliency detection method, which may include that: a network transmission rate between the terminal and the server is acquired, and if the network transmission rate is less than a preset transmission rate, the to-be-displayed image is identified with the saliency detection method.

In still another embodiment, the to-be-displayed image is identified with the saliency detection method, which may include that: attribute information of the to-be-displayed image is acquired, and a network transmission rate between the terminal and the server is acquired, and if the attribute information of the to-be-displayed image meets a preset condition and the network transmission rate is less than a preset transmission rate, the to-be-displayed image is identified with the saliency detection method.

In Step 304, a sending order is determined based on the first saliency priority and the second saliency priority.

In Step 305, at least two first sub-image regions are determined in the first image region.

In an embodiment, the at least two first sub-image regions are determined in the first image region, which may include that: the first image region is identified with the saliency detection method to obtain at least two first sub-regions and obtain saliency priorities of the at least two first sub-regions.

In another embodiment, the at least two first sub-image regions are determined in the first image region, which may include that: the first image region is identified with an edge detection method to obtain at least two first sub-image regions.

In still another embodiment, the at least two first sub-image regions are determined in the first image region, which may include that: the first image region is divided at a preset rule to obtain the at least two first sub-image regions. The number of pixel in the at least two first sub-image regions may be equal, and may also be unequal.

In Step 306, a first sending priority of each first sub-image region is determined.

In an embodiment, the first sending priority of each first sub-image region is determined, which may include that: scenario analysis is performed on each first sub-image region to obtain a first analysis result; and the first sending priority of each first sub-image region is determined based on the first analysis result.

Analysis is performed on scenario of each first sub-image region to obtain the first analysis result, which may include that: the scenario analysis is performed on each first sub-image region based on feature parameters of pixel in each first sub-image region in the at least two first sub-image regions to obtain the first analysis result. The first analysis result may be a scenario result. The server may pre-store a relationship list between a preset scenario and a preset sending priority. The relationship list between the preset scenario and the preset sending priority may be set by the user independently, for example, the preset scenario may include the person, animal, building, plant and other scenarios, and the processor may set the person as the sending priority at the highest level and set another scenario as the sending priority at the lowest level, etc.

Correspondingly, the first sending priority of each first sub-image region is determined based on the first analysis result, which may include that: the first sending priority of each first sub-image region is determined based on the first analysis result and the relationship list.

For example, the processor determines three image regions in the first image region, and performs analysis on scenario of the first image region to obtain a person for characterizing the first image region; performs analysis on scenario of the second image region to obtain a building for characterizing the second image region; and performs analysis on scenario of the third image region to obtain flowing water for characterizing the third image region; and the processor sequentially sends the first image region, the second image region and the third image region to the terminal.

In another embodiment, the first sending priority of each first sub-image region is determined, which may include that: the first sending priority of each first sub-image region is determined based on the at least two first sub-regions and the saliency priorities of the at least two first sub-regions. The saliency priority may correspond to the first sending priority. The higher the saliency priority, the higher the first sending priority.

In still another embodiment, the first sending priority of each first sub-image region is determined, which may include that: an average gray value of pixel in each sub-image region in the at least two first sub-image regions is acquired, and the first sending priority of each first sub-image region is determined based on the average gray value. The average gray value may correspond to the first sending priority. The higher the average gray value, the higher the first sending priority.

In Step 307, each first sub-image region is sent to the terminal according to the first sending priority, and the second image region is sent to the terminal after the at least two first sub-image regions are sent completely.

In an embodiment, each first sub-image region is sent to the terminal according to the first sending priority, which may include that: each first sub-image region is sent to the terminal row by row according to the first sending priority. In another embodiment, each first sub-image region is sent to the terminal according to the first sending priority, which may include that: feature parameters of a first part of pixel in each first sub-image region are sent to the terminal according to the first sending priority, and after the feature parameters of the first part of pixel in each first sub-image region are sent completely, feature parameters of a second part of pixel in each first sub-image region are sent to the terminal. The feature parameters of the first part of pixel are configured to form the first sub-image region with the low resolution.

A specific implementation of Step 307 may refer to the descriptions on steps E1-E4.

In Step E1, at least two second sub-image regions are determined in the second image region.

The implementation that the at least two second sub-image regions are determined in the second image region may be similar to the implementation that the at least two first sub-image regions are determined in the first image region. The specific implementation may refer to the descriptions in Step 305, and will not be repeated herein.

In Step E2, a second sending priority of each second sub-image region is determined.

In an embodiment, the second sending priority of each second sub-image region is determined, which may include that: scenario analysis is performed on each second sub-image region to obtain a second analysis result; and the second sending priority of each second sub-image region is determined based on the second analysis result.

The implementation that the second sending priority of each second sub-image region is determined may be similar to the implementation that the first sending priority of each first sub-image region is determined. The specific implementation may refer to the descriptions in Step 306, and will not be repeated herein.

In Step E3, each first sub-image region is sent to the terminal according to the first sending priority.

In Step E4, each second sub-image region is sent to the terminal according to the second sending priority after the at least two first sub-image regions are sent completely.

Correspondingly, each second sub-image region is sent to the terminal, which may be that each second sub-image region is sent to the terminal row by row, and may also be that after feature parameters of a first part of pixel in each second image region are sent completely, feature parameters of a second part of pixel in each second image region are sent to the terminal.

It is to be noted that the descriptions on the same steps and same contents in the embodiment with the other embodiments may refer to the descriptions in the other embodiments, and will not be repeated herein.

In the embodiment of the disclosure, the server may sequentially send the first image region and the second image region to the terminal in the sending order, and the terminal can receive the first image region and the second image region based on the sending order of the processor, such that the terminal may display one image including the to-be-displayed object to the user first, thereby solving the problem that the terminal cannot display one image including the to-be-displayed object to the user first in the related art; and in addition, as the operation of identifying the to-be-displayed image is performed on the server, the energy consumption and the amount of computation of the terminal can be reduced.

Figure 4:
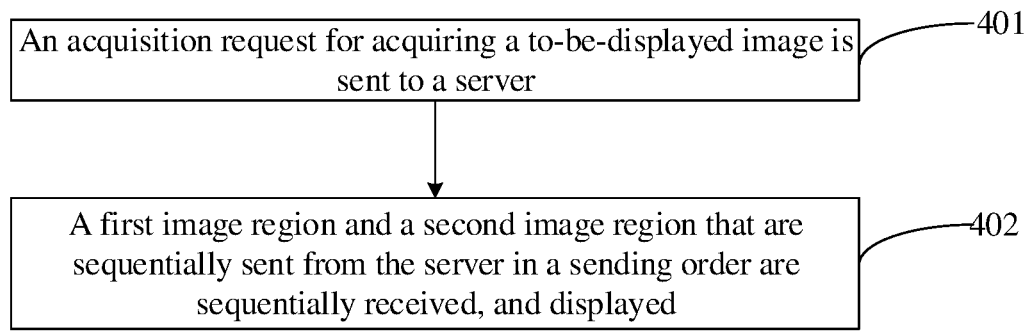
FIG. 4 is a schematic flowchart of an information processing method provided in another embodiment of the disclosure.

Based on the above embodiment, the embodiments of the disclosure provide an information processing method, which may be applied to a terminal. As illustrated in FIG. 4, the method may include the following steps.

In Step 401, an acquisition request for acquiring a to-be-displayed image is sent to a server.

The acquisition request carries an identifier of the to-be-displayed image.

In Step 402, a first image region and a second image region that are sequentially sent from the server in a sending order are sequentially received, and displayed.

The first image region and the second image region are obtained by the server through identifying the to-be-displayed image corresponding to the identifier of the to-be-displayed image; and the sending order is determined by the server.

The first image region and the second image region that are sequentially sent from the server in the sending order are sequentially received, and displayed, which may include that: after attribute information of the to-be-displayed image sent from the server is received, the first image region and the second image region that are sequentially sent from the server according to the sending sequence are sequentially received.

It is to be noted that the descriptions on the same steps and same contents in the embodiment with the other embodiments may refer to the descriptions in the other embodiments, and will not be repeated herein.

In the embodiment of the disclosure, the terminal sequentially receives the first image region and the second image region that are sequentially sent from the server in the sending order, such that the terminal may display one image including the to-be-displayed object to the user first, thereby solving the problem that the terminal cannot display one image including the to-be-displayed object to the user first in the related art; and in addition, as the image is unnecessarily subjected to any processing, and only image data sent from the server is received, thereby reducing the energy consumption and the amount of computation of the terminal.

Figure 5:
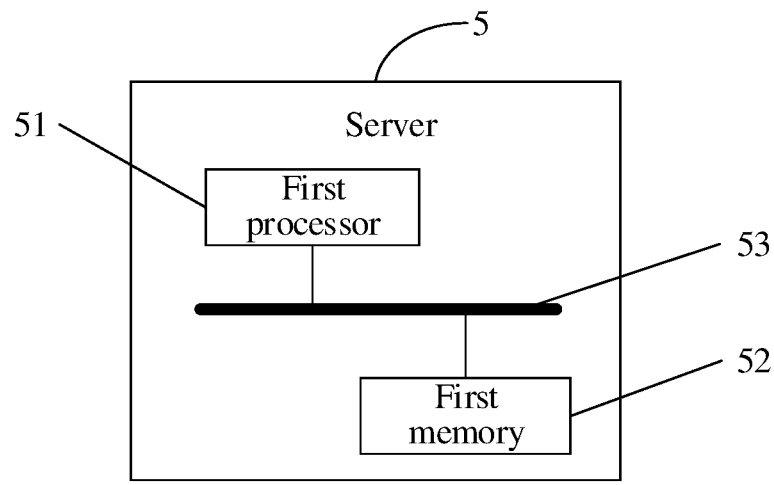
FIG. 5 is a structural schematic diagram of a server provided in an embodiment of the disclosure.

Based on the above embodiments, the embodiments of the disclosure provide a server. The server may be applied to the information processing method provided by the embodiments corresponding to FIGS. 1-3. Referring to FIG. 5, the server 5 may include: a first processor 51, a first memory 52 and a first communication bus 53.

The first communication bus 53 is configured to implement communication connection between the first processor 51 and the first memory 52.

The first processor 51 is configured to execute a program of an information processing method stored in the first memory 52, to implement the following steps.

An acquisition request for acquiring a to-be-displayed image is received from a terminal, wherein the acquisition request carries an identifier of the to-be-displayed image; and the to-be-displayed image includes a first to-be-displayed object and a second to-be-displayed object.

The to-be-displayed image corresponding to the identifier is acquired based on the acquisition request, and the to-be-displayed image is identified to obtain a first image region and a second image region, wherein the first image region includes the first to-be-displayed object; and the second image region includes the second to-be-displayed object.

A sending order is determined, and the first image region and the second image region are sequentially sent to the terminal in the sending order.

In other embodiments of the disclosure, the first processor 51 is configured to execute the to-be-displayed image, stored in the first memory 52, that is acquired corresponding to the identifier based on the acquisition request, and the to-be-displayed image is identified to obtain the first image region and the second image region, to implement the following steps.

The to-be-displayed image corresponding to the identifier is acquired based on the acquisition request.

The to-be-displayed image is identified with a saliency detection method to obtain the first image region and a first saliency priority corresponding to the first image region, and the second image region and a second saliency priority corresponding to the second image region, wherein the first saliency priority is higher than the second saliency priority.

Correspondingly, the first processor 51 is configured to execute the operation, stored in the first memory 52, that the sending order is determined, and the first image region and the second image region are sequentially sent to the terminal in the sending order, to implement the following steps.

The sending order is determined based on the first saliency priority and the second saliency priority.

The first image region and the second image region are sequentially sent to the terminal based on the sending order.

In other embodiments of the disclosure, the first processor 51 is configured to execute the operation, stored in the first memory 52, that the first image region and the second image region are sequentially sent to the terminal based on the sending order, to implement the following steps.

At least two first sub-image regions are determined in the first image region.

A first sending priority of each first sub-image region is determined.

Each first sub-image region is sent to the terminal according to the first sending priority, and the second image region is sent to the terminal after the at least two first sub-image regions are sent completely.

In other embodiments of the disclosure, the first processor 51 is configured to execute the operation, stored in the first memory 52, that each first sub-image region is sent to the terminal according to the first sending priority, and the second image region is sent to the terminal after the at least two first sub-image regions are sent completely, to implement the following steps.

At least two second sub-image regions are determined in the second image region.

A second sending priority of each second sub-image region is determined.

Each first sub-image region is sent to the terminal according to the first sending priority.

Each second sub-image region is sent to the terminal according to the second sending priority after the at least two first sub-image regions are sent completely.

In other embodiments of the disclosure, the first processor 51 is configured to execute the operation, stored in the first memory 52, that the first sending priority of each first sub-image region is determined, to implement the following steps.

Analysis is performed on scenario of each first sub-image region to obtain a first analysis result.

The first sending priority of each first sub-image region is determined based on the first analysis result.

Correspondingly, the first processor 51 is configured to execute the operation, stored in the first memory 52, that the second sending priority of each second sub-image region is determined, to implement the following steps.

Analysis is performed on scenario of each second sub-image region to obtain a second analysis result.

The second sending priority of each second sub-image region is determined based on the second analysis result.

In other embodiments of the disclosure, the first processor 51 is configured to execute the operation, stored in the first memory 52, that the first image region and the second image region are sequentially sent to the terminal based on the sending order, to implement the following steps.

First gray values of pixel in the first image region and second gray values of pixel in the second image region are respectively acquired.

Feature parameters of the pixel in the first image region are sent to the terminal according to an order of the first gray values from large to small.

After the feature parameters of the pixel in the first image region are sent completely, feature parameters of the pixel in the second image region are sent to the terminal according to an order of the second gray values from large to small.

In other embodiments of the disclosure, the first processor 51 is configured to execute the operation, stored in the first memory 52, that the first image region and the second image region are sequentially sent to the terminal based on the sending order, to implement the following steps.

First position parameters of pixel in the first image region and second position parameters of pixel in the second image region are respectively acquired.

Feature parameters of the pixel in the first image region are sent to the terminal row by row based on the first position parameters.

After the feature parameters of the pixel in the first image region are sent completely, feature parameters of the pixel in the second image region are sent to the terminal row by row based on the second position parameters.

In other embodiments of the disclosure, the first processor 51 is configured to execute the operation, stored in the first memory 52, that the first image region and the second image region are sequentially sent to the terminal based on the sending order, to implement the following steps.

Feature parameters of a first part of pixel in the first image region are sent to the terminal.

After the feature parameters of the first part of pixel in the first image region are sent completely, feature parameters of a first part of pixel in the second image region are sent to the terminal.

After the feature parameters of the first part of pixel in the second image region are sent completely, feature parameters of a second part of pixel in the first image region are sent to the terminal.

After the feature parameters of the second part of pixel in the first image region are sent completely, feature parameters of a second part of pixel in the second image region are sent to the terminal.

The first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

In other embodiments of the disclosure, the first processor 51 is configured to execute the operation, stored in the first memory 52, that the first image region and the second image region are sequentially sent to the terminal based on the sending order, to implement the following steps.

Feature parameters of a first part of pixel in the first image region are sent to the terminal.

After the feature parameters of the first part of pixel in the first image region are sent completely, feature parameters of a second part of pixel in the first image region are sent to the terminal.

After the feature parameters of the second part of pixel in the first image region are sent completely, feature parameters of a first part of pixel in the second image region are sent to the terminal.

After the feature parameters of the first part of pixel in the second image region are sent completely, feature parameters of a second part of pixel in the second image region are sent to the terminal.

The first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

It is to be noted that specific implementation processes of the steps executed by the first processor in the embodiment may refer to the implementation processes in the information processing method provided by the embodiments corresponding to FIGS. 1-3, and will not be repeated herein.

In the embodiment of the disclosure, the server may sequentially send the first image region and the second image region to the terminal in the sending order, and the terminal can receive the first image region and the second image region based on the sending order of the processor, such that the terminal may display one image including the to-be-displayed object to the user first, thereby solving the problem that the terminal cannot display one image including the to-be-displayed object to the user first in the related art; and in addition, as the operation of identifying the to-be-displayed image is performed on the server, the energy consumption and the amount of computation of the terminal can be reduced.

Figure 6:
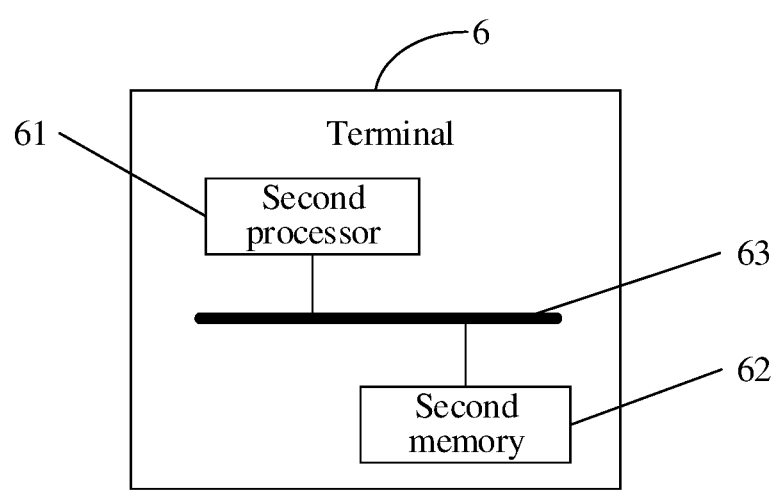
FIG. 6 is a structural schematic diagram of a terminal provided in an embodiment of the disclosure.

Based on the above embodiments, the embodiments of the disclosure provide a terminal. The terminal may be applied to the information processing method provided by the embodiment corresponding to FIG. 4. Referring to FIG. 6, the terminal 6 may include: a second processor 61, a second memory 62 and a second communication bus 63.

The second communication bus 63 is configured to implement communication connection between the second processor 61 and the second memory 62.

The second processor 61 is configured to execute a program of an information processing method stored in the second memory 62, to implement the following steps.

An acquisition request for acquiring a to-be-displayed image is sent to a server, wherein the acquisition request carries an identifier of the to-be-displayed image.

A first image region and a second image region that are sequentially sent from the server in a sending order are sequentially received, and displayed, wherein the first image region and the second image region are obtained by the server through identifying the to-be-displayed image corresponding to the identifier of the to-be-displayed image; and the sending order is determined by the server.

It is to be noted that specific implementation processes of the steps executed by the second processor in the embodiment may refer to the implementation processes in the information processing method provided by the embodiment corresponding to FIG. 4, and will not be repeated herein.

Based on the above embodiments, the embodiments of the disclosure provide a computer storage medium, which stores one or more programs; and the one or more programs are executed by one or more processors, to implement the following steps.

An acquisition request for acquiring a to-be-displayed image is received from a terminal, wherein the acquisition request carries an identifier of the to-be-displayed image; and the to-be-displayed image includes a first to-be-displayed object and a second to-be-displayed object.

The to-be-displayed image corresponding to the identifier is acquired based on the acquisition request, and the to-be-displayed image is identified to obtain a first image region and a second image region, wherein the first image region includes the first to-be-displayed object; and the second image region includes the second to-be-displayed object.

A sending order is determined, and the first image region and the second image region are sequentially sent to the terminal in the sending order.

In other embodiments of the disclosure, the one or more programs may be executed by the one or more processors to execute the operation that the to-be-displayed image corresponding to the identifier is acquired based on the acquisition request, and the to-be-displayed image is identified to obtain the first image region and the second image region, to implement the following steps.

The to-be-displayed image corresponding to the identifier is acquired based on the acquisition request.

The to-be-displayed image is identified with a saliency detection method to obtain the first image region and a first saliency priority corresponding to the first image region, and the second image region and a second saliency priority corresponding to the second image region, wherein the first saliency priority is higher than the second saliency priority.

Correspondingly, the one or more programs may be executed by the one or more processors to execute the operation that the sending order is determined, and the first image region and the second image region are sequentially sent to the terminal in the sending order, to implement the following steps.

The sending order is determined based on the first saliency priority and the second saliency priority.

The first image region and the second image region are sequentially sent to the terminal based on the sending order.

In other embodiments of the disclosure, the one or more programs may be executed by the one or more processors to execute the operation that the first image region and the second image region are sequentially sent to the terminal based on the sending order, to implement the following steps.

At least two first sub-image regions are determined in the first image region.

A first sending priority of each first sub-image region is determined.

Each first sub-image region is sent to the terminal according to the first sending priority, and the second image region is sent to the terminal after the at least two first sub-image regions are sent completely.

In other embodiments of the disclosure, the one or more programs may be executed by the one or more processors to execute the operation that each first sub-image region is sent to the terminal according to the first sending priority, and the second image region is sent to the terminal after the at least two first sub-image regions are sent completely, to implement the following steps.

At least two second sub-image regions are determined in the second image region.

A second sending priority of each second sub-image region is determined.

Each first sub-image region is sent to the terminal according to the first sending priority.

Each second sub-image region is sent to the terminal according to the second sending priority after the at least two first sub-image regions are sent completely.

In other embodiments of the disclosure, the one or more programs may be executed by the one or more processors to execute the operation that the first sending priority of each first sub-image region is determined, to implement the following steps.

Analysis is performed on scenario of each first sub-image region to obtain a first analysis result.

The first sending priority of each first sub-image region is determined based on the first analysis result.

Correspondingly, the one or more programs may be executed by the one or more processors to execute the operation that the second sending priority of each second sub-image region is determined, to implement the following steps.

Analysis is performed on scenario of each second sub-image region to obtain a second analysis result.

The second sending priority of each second sub-image region is determined based on the second analysis result.

In other embodiments of the disclosure, the one or more programs may be executed by the one or more processors to execute the operation that the first image region and the second image region are sequentially sent to the terminal based on the sending order, to implement the following steps.

First gray values of pixel in the first image region and second gray values of pixel in the second image region are respectively acquired.

Feature parameters of the pixel in the first image region are sent to the terminal according to an order of the first gray values from large to small.

After the feature parameters of the pixel in the first image region are sent completely, feature parameters of the pixel in the second image region are sent to the terminal according to an order of the second gray values from large to small.

In other embodiments of the disclosure, the one or more programs may be executed by the one or more processors to execute the operation that the first image region and the second image region are sequentially sent to the terminal based on the sending order, to implement the following steps.

First position parameters of pixel in the first image region and second position parameters of pixel in the second image region are respectively acquired.

Feature parameters of the pixel in the first image region are sent to the terminal row by row based on the first position parameters.

After the feature parameters of the pixel in the first image region are sent completely, feature parameters of the pixel in the second image region are sent to the terminal row by row based on the second position parameters.

In other embodiments of the disclosure, the one or more programs may be executed by the one or more processors to execute the operation that the first image region and the second image region are sequentially sent to the terminal based on the sending order, to implement the following steps.

Feature parameters of a first part of pixel in the first image region are sent to the terminal.

After the feature parameters of the first part of pixel in the first image region are sent completely, feature parameters of a first part of pixel in the second image region are sent to the terminal.

After the feature parameters of the first part of pixel in the second image region are sent completely, feature parameters of a second part of pixel in the first image region are sent to the terminal.

After the feature parameters of the second part of pixel in the first image region are sent completely, feature parameters of a second part of pixel in the second image region are sent to the terminal.

The first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

In other embodiments of the disclosure, the one or more programs may be executed by the one or more processors to execute the operation that the first image region and the second image region are sequentially sent to the terminal based on the sending order, to implement the following steps.

Feature parameters of a first part of pixel in the first image region are sent to the terminal.

After the feature parameters of the first part of pixel in the first image region are sent completely, feature parameters of a second part of pixel in the first image region are sent to the terminal.

After the feature parameters of the second part of pixel in the first image region are sent completely, feature parameters of a first part of pixel in the second image region are sent to the terminal.

After the feature parameters of the first part of pixel in the second image region are sent completely, feature parameters of a second part of pixel in the second image region are sent to the terminal.

The first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

Based on the above embodiments, the embodiments of the disclosure provide a computer storage medium, which stores one or more programs; and the one or more programs are executed by one or more processors, to implement the following steps.

An acquisition request for acquiring a to-be-displayed image is sent to a server, wherein the acquisition request carries an identifier of the to-be-displayed image.

A first image region and a second image region that are sequentially sent from the server in a sending order are sequentially received, and displayed, wherein the first image region and the second image region are obtained by the server through identifying the to-be-displayed image corresponding to the identifier of the to-be-displayed image; and the sending order is determined by the server.

It is to be noted that the above first processor or second processor may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller or a microprocessor. It may be understood that the electronic device for implementing functions of the above first processor or second processor may further be another device, which is not specifically limited in the embodiments of the disclosure.

It is to be noted that the above computer storage medium/memory may be a memory such as a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disc or a Compact Disc Read-Only Memory (CD-ROM); and may also be a terminal including one or any combination of the above memories, such as a server, a terminal, a mobile phone, a computer, a tablet, and a PDA.

It is to be noted that the terms "include", "contain" or any other variations thereof are intended to cover a non-exclusive inclusion, such that a process, method, article or equipment including a series of elements not only includes those elements, but also includes those elements that are not explicitly listed, or includes elements inherent to such a process, method, article or device. Under the condition of no more limitations, it is not excluded that additional identical elements further exist in the process, method, article or device including elements defined by a sentence "including a . . . ".

The serial numbers of the embodiments of the application are merely for description and do not represent a preference of the embodiments.

By means of the above-mentioned descriptions on the implementation manners, the person skilled in the art may clearly understand that the methods in the embodiments may be implemented by software plus a necessary universal hardware platform, and may also be implemented by hardware certainly, but under most conditions, the former is a better implementation manner. Based on such an understanding, the technical solutions of the application substantially or parts making contributions to the conventional art may be embodied in form of software product, and the computer software product is stored in a storage medium (such as an ROM/RAM, a magnetic disk and an optical disc), including a plurality of instructions configured to enable a terminal device (which may be a mobile phone, a terminal, a mobile phone, a computer, a server, an air conditioner, a network device or the like) to execute the method in each embodiment of the application.

The present application is described with reference to flowcharts and/or block diagrams of the method, the device (system) and the computer program product according to the embodiments of the present application. It is be understood that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The above are merely preferred embodiments of the application rather than a limit to a scope of the application. Any equivalent structure or equivalent process transformation made with the specification and contents of the accompanying drawings of the application, or direct or indirect utilization in other related technical fields are all included in the protection scope of the application.

INDUSTRIAL APPLICABILITY

In the embodiments of the disclosure, the server first receives the acquisition request sent from the terminal and configured to acquire the to-be-displayed image including the first to-be-displayed object and the second to-be-displayed object; then acquires the to-be-displayed image corresponding to the identifier based on the acquisition request, and identifies the to-be-displayed image to obtain the first image region and the second image region, wherein the first image region includes the first to-be-displayed object; and the second image region includes the second to-be-displayed object; and then sequentially sends the first image region and the second image region to the terminal in the sending order. In this way, the server may sequentially send the first image region and the second image region to the terminal in the sending order, and the terminal can receive the first image region and the second image region based on the sending order of the processor, such that the terminal may display one image including the to-be-displayed object to the user first, thereby solving the problem that the terminal cannot display one image including the to-be-displayed object to the user first in the related art; and in addition, as the operation of identifying the to-be-displayed image is performed on the server, the energy consumption and the amount of computation of the terminal can be reduced.

The invention claimed is:

1. A method for information processing, comprising:
  receiving an acquisition request from a terminal for acquiring a to-be-displayed image, the acquisition request carrying an identifier of the to-be-displayed image, and the to-be-displayed image comprising a first to-be-displayed object and a second to-be-displayed object;
  acquiring the to-be-displayed image corresponding to the identifier based on the acquisition request and identifying the to-be-displayed image to obtain a first image region and a second image region, the first image region comprising the first to-be-displayed object, and the second image region comprising the second to-be-displayed object; and
  determining a sending order and sequentially sending the first image region and the second image region to the terminal in the sending order;
  wherein acquiring the to-be-displayed image corresponding to the identifier based on the acquisition request and identifying the to-be-displayed image to obtain the first image region and the second image region comprises:
    acquiring the to-be-displayed image corresponding to the identifier based on the acquisition request; and
    identifying the to-be-displayed image with a saliency detection method to obtain the first image region and a first saliency priority corresponding to the first image region, and the second image region and a second saliency priority corresponding to the second image region, wherein the first saliency priority is higher than the second saliency priority,
  and wherein correspondingly, determining the sending order and sequentially sending the first image region and the second image region to the terminal in the sending order comprises:
    determining the sending order based on the first saliency priority and the second saliency priority; and
    sequentially sending the first image region and the second image region to the terminal based on the sending order.

2. The method of claim 1, wherein sequentially sending the first image region and the second image region to the terminal based on the sending order comprises:
  determining at least two first sub-image regions in the first image region;
  determining a first sending priority of each first sub-image region; and
  sending each first sub-image region to the terminal according to the first sending priority and sending the second image region to the terminal after sending the at least two first sub-image regions completely.

3. The method of claim 2, wherein sending each first sub-image region to the terminal according to the first sending priority and sending the second image region to the terminal after sending the at least two first sub-image regions completely comprises:
  determining at least two second sub-image regions in the second image region;
  determining a second sending priority of each second sub-image region;

sending each first sub-image region to the terminal according to the first sending priority; and sending each second sub-image region to the terminal according to the second sending priority after sending the at least two first sub-image regions completely.

4. The method of claim 3, wherein determining the first sending priority of each first sub-image region comprises:

performing analysis on scenario of each first sub-image region to obtain a first analysis result; and determining the first sending priority of each first sub-image region based on the first analysis result, and wherein correspondingly, determining the second sending priority of each second sub-image region comprises:

performing analysis on scenario of each second sub-image region to obtain a second analysis result; and determining the second sending priority of each second sub-image region based on the second analysis result.

5. The method of claim 1, wherein sequentially sending the first image region and the second image region to the terminal based on the sending order comprises:

respectively acquiring first gray values of pixel in the first image region and second gray values of pixel in the second image region;

sending feature parameters of the pixel in the first image region to the terminal according to an order of the first gray values from large to small; and sending, after sending the feature parameters of the pixel in the first image region completely, feature parameters of the pixel in the second image region to the terminal according to an order of the second gray values from large to small.

6. The method of claim 1, wherein sequentially sending the first image region and the second image region to the terminal based on the sending order comprises:

respectively acquiring first position parameters of pixel in the first image region and second position parameters of pixel in the second image region;

sending feature parameters of the pixel in the first image region to the terminal row by row based on the first position parameters; and sending, after sending the feature parameters of the pixel in the first image region completely, feature parameters of the pixel in the second image region to the terminal row by row based on the second position parameters.

7. The method of claim 1, wherein sequentially sending the first image region and the second image region to the terminal based on the sending order comprises:

sending feature parameters of a first part of pixel in the first image region to the terminal;

sending, after sending the feature parameters of the first part of pixel in the first image region completely, feature parameters of a first part of pixel in the second image region to the terminal;

sending, after sending the feature parameters of the first part of pixel in the second image region completely, feature parameters of a second part of pixel in the first image region to the terminal; and sending, after sending the feature parameters of the second part of pixel in the first image region completely, feature parameters of a second part of pixel in the second image region to the terminal, wherein the first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

8. The method of claim 1, wherein sequentially sending the first image region and the second image region to the terminal based on the sending order comprises:

sending feature parameters of a first part of pixel in the first image region to the terminal;

sending, after sending the feature parameters of the first part of pixel in the first image region completely, feature parameters of a second part of pixel in the first image region to the terminal;

sending, after sending the feature parameters of the second part of pixel in the first image region completely, feature parameters of a first part of pixel in the second image region to the terminal; and sending, after sending the feature parameters of the first part of pixel in the second image region completely, feature parameters of a second part of pixel in the second image region to the terminal, wherein the first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

9. A server, comprising:

a processor, a memory and a communication bus, wherein the communication bus is configured to implement communication connection between the processor and the memory; and the processor is configured to execute a program of an information processing method in the memory, to implement steps of:

receiving an acquisition request from a terminal for acquiring a to-be-displayed image, the acquisition request carrying an identifier of the to-be-displayed image, and the to-be-displayed image comprising a first to-be-displayed object and a second to-be-displayed object;

acquiring the to-be-displayed image corresponding to the identifier based on the acquisition request and identifying the to-be-displayed image to obtain a first image region and a second image region, the first image region comprising the first to-be-displayed object, and the second image region comprising the second to-be-displayed object; and determining a sending order and sequentially sending the first image region and the second image region to the terminal in the sending order;

wherein acquiring the to-be-displayed image corresponding to the identifier based on the acquisition request and identifying the to-be-displayed image to obtain the first image region and the second image region comprises:

acquiring the to-be-displayed image corresponding to the identifier based on the acquisition request; and identifying the to-be-displayed image with a saliency detection method to obtain the first image region and a first saliency priority corresponding to the first image region, and the second image region and a second saliency priority corresponding to the second image region, wherein the first saliency priority is higher than the second saliency priority, and wherein correspondingly, determining the sending order and sequentially sending the first image region and the second image region to the terminal in the sending order comprises:

determining the sending order based on the first saliency priority and the second saliency priority; and sequentially sending the first image region and the second image region to the terminal based on the sending order.

10. The server of claim 9, wherein the processor is configured to execute the program of the information processing method in the memory to implement steps of:

determining at least two first sub-image regions in the first image region;

determining a first sending priority of each first sub-image region; and sending each first sub-image region to the terminal according to the first sending priority and sending the second image region to the terminal after sending the at least two first sub-image regions completely.

11. The server of claim 10, wherein the processor is configured to execute the program of the information processing method in the memory to implement steps of:

determining at least two second sub-image regions in the second image region;

determining a second sending priority of each second sub-image region;

sending each first sub-image region to the terminal according to the first sending priority; and sending each second sub-image region to the terminal according to the second sending priority after sending the at least two first sub-image regions completely.

12. The server of claim 11, wherein the processor is configured to execute the program of the information processing method in the memory to implement steps of:

performing analysis on scenario of each first sub-image region to obtain a first analysis result;

determining the first sending priority of each first sub-image region based on the first analysis result;

performing analysis on scenario of each second sub-image region to obtain a second analysis result; and determining the second sending priority of each second sub-image region based on the second analysis result.

13. The server of claim 9, wherein the processor is configured to execute the program of the information processing method in the memory to implement steps of:

respectively acquiring first gray values of pixel in the first image region and second gray values of pixel in the second image region;

sending feature parameters of the pixel in the first image region to the terminal according to an order of the first gray values from large to small; and sending, after sending the feature parameters of the pixel in the first image region completely, feature parameters of the pixel in the second image region to the terminal according to an order of the second gray values from large to small.

14. The server of claim 9, wherein the processor is configured to execute the program of the information processing method in the memory to implement steps of:

respectively acquiring first position parameters of pixel in the first image region and second position parameters of pixel in the second image region;

sending feature parameters of the pixel in the first image region to the terminal row by row based on the first position parameters; and sending, after sending the feature parameters of the pixel in the first image region completely, feature parameters of the pixel in the second image region to the terminal row by row based on the second position parameters.

15. The server of claim 9, wherein the processor is configured to execute the program of the information processing method in the memory to implement steps of:

sending feature parameters of a first part of pixel in the first image region to the terminal;

sending, after sending the feature parameters of the first part of pixel in the first image region completely, feature parameters of a first part of pixel in the second image region to the terminal;

sending, after sending the feature parameters of the first part of pixel in the second image region completely, feature parameters of a second part of pixel in the first image region to the terminal; and sending, after sending the feature parameters of the second part of pixel in the first image region completely, feature parameters of a second part of pixel in the second image region to the terminal, wherein the first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

16. The server of claim 9, wherein the processor is configured to execute the program of the information processing method in the memory to implement steps of:

sending feature parameters of a first part of pixel in the first image region to the terminal; and sending, after sending the feature parameters of the first part of pixel in the first image region completely, feature parameters of a second part of pixel in the first image region to the terminal;

sending, after sending the feature parameters of the second part of pixel in the first image region completely, feature parameters of a first part of pixel in the second image region to the terminal; and sending, after sending the feature parameters of the first part of pixel in the second image region completely, feature parameters of a second part of pixel in the second image region to the terminal, wherein the first part of pixel in the first image region are configured to form the first image region with low resolution; the first part of pixel in the second image region are configured to form the second image region with the low resolution; the second part of pixel in the first image region are pixel other than the first part of pixel in the first image region; and the second part of pixel in the second image region are pixel other than the first part of pixel in the second image region.

* * * * *